Figure 1:
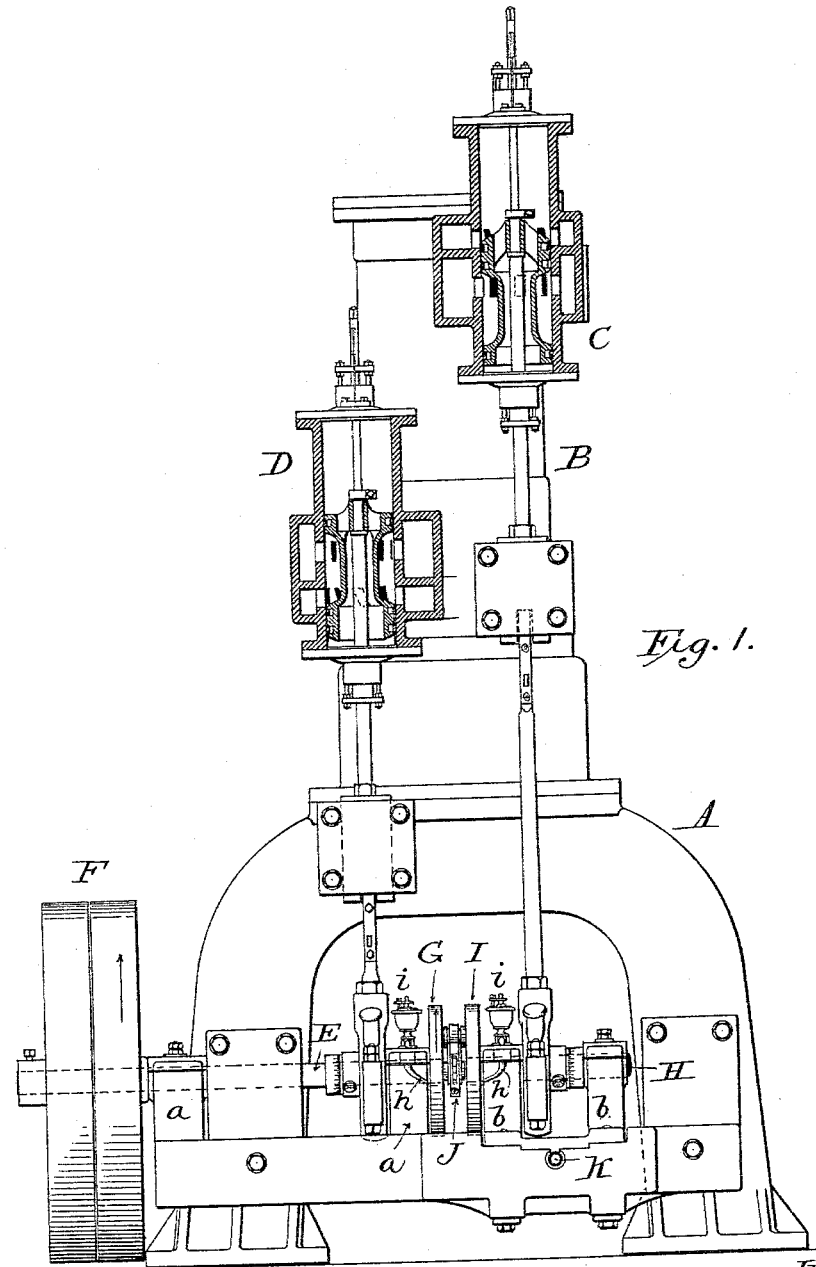

(No Model.) 4 Sheets—Sheet 1.

E. REYNOLDS & B. V. NORDBERG.
VALVE MECHANISM FOR ORE STAMPS.

No. 398,903. Patented Mar. 5, 1889.

Attest:
Sidney Hollingsworth
Horace A. Dodge

Inventors:
Edwin Reynolds
Bruno V. Nordberg
by Dodge Sons,
Attys.

(No Model.) 4 Sheets—Sheet 2.

E. REYNOLDS & B. V. NORDBERG.
VALVE MECHANISM FOR ORE STAMPS.

No. 398,903. Patented Mar. 5, 1889.

Attest:
Sidney P. Hollingsworth
Horace A. Dodge.

Inventors:
Edwin Reynolds,
Bruno V. Nordberg,
by Dodge Sons,
Attys.

(No Model.) 4 Sheets—Sheet 3.

E. REYNOLDS & B. V. NORDBERG.
VALVE MECHANISM FOR ORE STAMPS.

No. 398,903. Patented Mar. 5, 1889.

Attest:
Sidney P. Hollingsworth
Horace A. Dodge

Inventors:
Edwin Reynolds,
Bruno V. Nordberg,
by Dodge Sons,
Attys.

(No Model.) 4 Sheets—Sheet 4.

E. REYNOLDS & B. V. NORDBERG.
VALVE MECHANISM FOR ORE STAMPS.

No. 398,903. Patented Mar. 5, 1889.

Attest:
James F. Duhamel.
Horace A. Dodge.

Inventors:
Edwin Reynolds &
Bruno V. Nordberg,
by Dodge Sons,
Attys.

UNITED STATES PATENT OFFICE.

EDWIN REYNOLDS AND BRUNO V. NORDBERG, OF MILWAUKEE, WISCONSIN.

VALVE MECHANISM FOR ORE-STAMPS.

SPECIFICATION forming part of Letters Patent No. 398,903, dated March 5, 1889.

Application filed August 21, 1888. Serial No. 283,324. (No model.)

*To all whom it may concern:*

Be it known that we, EDWIN REYNOLDS, a citizen of the United States, residing at Milwaukee, in the county of Milwaukee and State of Wisconsin, and BRUNO V. NORDBERG, a citizen of the Grand Duchy of Finland, residing at Milwaukee, Wisconsin, have invented certain new and useful Improvements in Valve Mechanisms for Ore-Stamps, of which the following is a specification.

Our invention relates to valve mechanism for ore-stamps, and is designed as an improvement upon the construction shown in Letters Patent No. 377,578, granted February 7, 1888, to Edwin Reynolds.

In machines of this character the number of blows to be struck by the stamp-shaft varies from ninety to one hundred per minute, and the shaft should be sent down quick on the rock in the mortar and pause there to insure a "dead" blow before it is again lifted, the velocity of lifting being naturally much slower than the velocity of drop. Consequently a rapid action of the valves is needed when the stamp-shaft is descending, while there must be a pause in the valve motion and subsequent slow period while the stamp-shaft rests upon the rock and while it is ascending. In other words, the motion of the valves has to correspond, as far as rapidity of action is concerned, with the motion of the stamp-shaft. The steam-inlet on top of the cylinder has to open quick and close quick. A period then succeeds during which the stamp-shaft rests on the rock and no steam is admitted, and then the bottom inlet-port is opened at a velocity corresponding to the velocity of the ascending stamp-shaft. To secure this movement, the elliptical gears shown in the Reynolds patent heretofore referred to have been employed; but the gears are subject to considerable wear, and frequently break. The wear on the bearings of the shaft changes the relative position of the center lines of the shafts and tends to change the running pitch-lines of the gears. It is also clear that the ratio of maximum and minimum velocity is with these gears a constant quantity and cannot be changed, except by changing gears. In order, therefore, to produce a valve-gear that will run without noise and with little wear of the parts, and in which the ratio of maximum to minimum velocity may be changed at will, is the object of the present invention.

Figure 2:
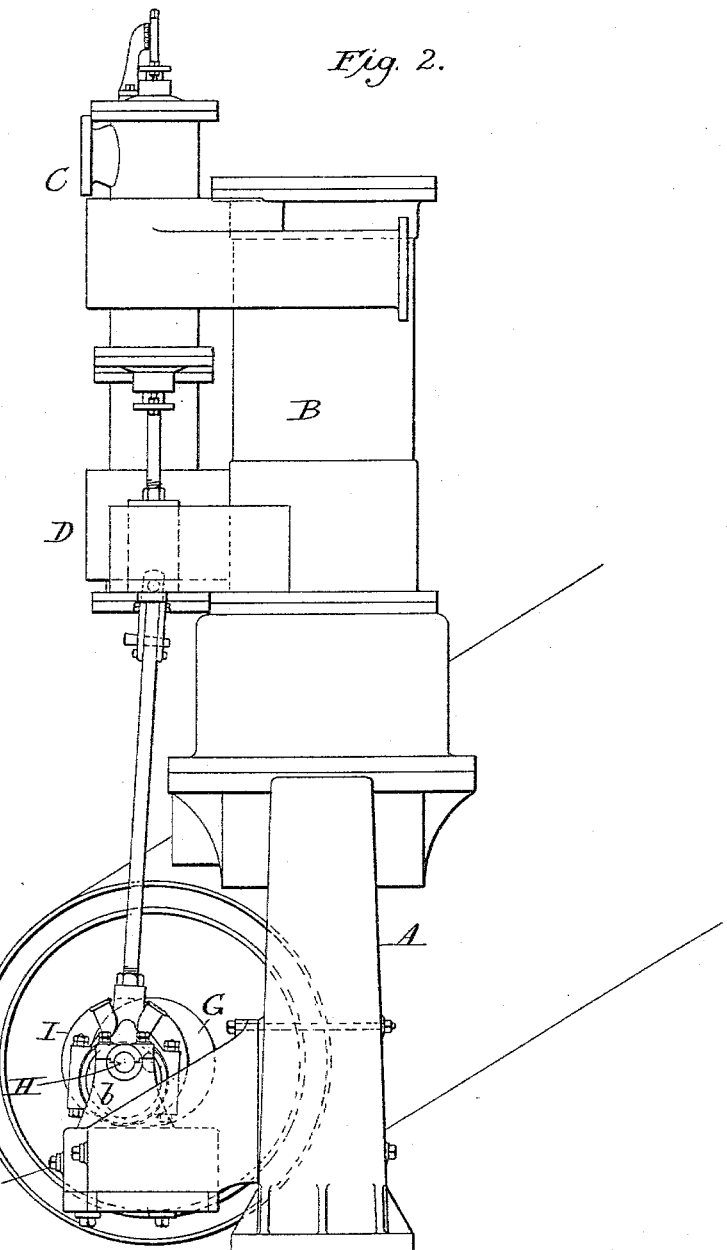
Figure 7:
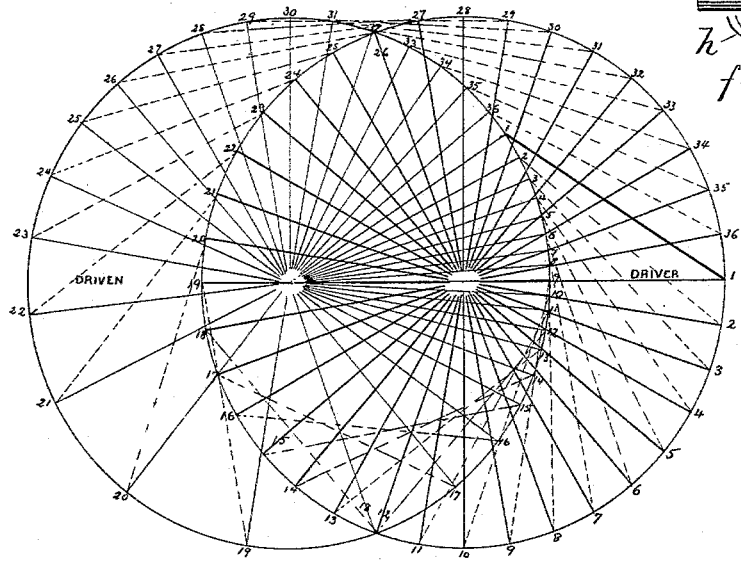
Figure 8:
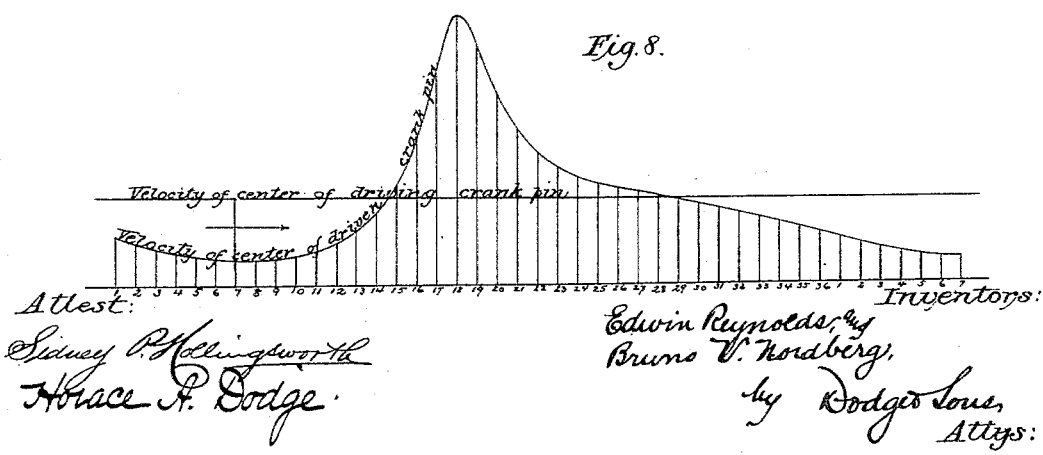

In the drawings, Figure 1 is a face view, partly in section, of our improved valve mechanism applied to an ore-stamp; Fig. 2, a side view of the same; Figs. 3, 4, 5, and 6, detail views; Figs. 7 and 8, diagrammatic views, and Figs. 9 and 10 views illustrating the application of the invention to mills in which a single valve is employed.

The steam-cylinder which we employ differs in construction very little from that of any other steam-engine, and may be fitted with valves of any type, and with one valve to effect the distribution of steam for both ends of the cylinder, or one valve for each end, or independent inlet and outlet valves, as used on the Corliss type of engines.

The construction of the cylinder and its valves may obviously be varied considerably without departing from the spirit of our invention, and as their construction *per se* forms no part of the present invention they will not be described in detail.

A indicates the frame-work supporting the steam-cylinder B, which latter is provided in the present instance with two valves, C and D, governing the admission of steam thereto.

E indicates a shaft journaled in bearings $a\ a$ on the main frame, the said shaft being provided at one end with a band-wheel, F, to which motion may be imparted from any convenient motor, and at the other end with a crank, G, which is represented in the form of a disk.

Figure 3:
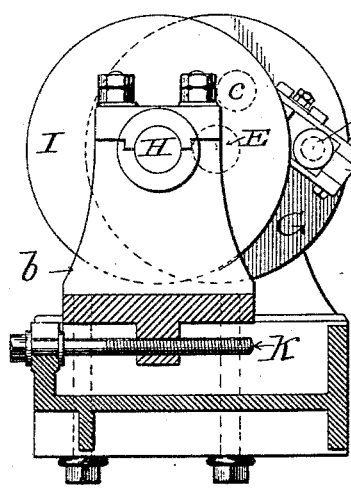
Figure 4:
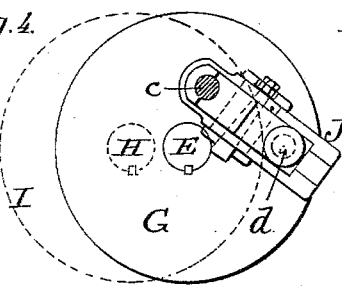

Mounted in bearings $b\ b$ on the main frame is a second shaft, H, provided with a crank, I, the crank-pin $c$ of which is connected with the crank-pin $d$ of crank G by means of a link, J, as shown in Figs. 1, 3, and 4.

The bearings $b\ b$ are adjustable upon the frame-work A by means of a screw, K, Figs. 1, 2, and 3, or in any other suitable manner, so as to bring the shaft H into or out of alignment with the shaft E. The valves C and D are shown as operated by means of eccentrics upon the shafts E and H; but we do not wish to limit ourselves to such an arrangement, as it is obvious that the construction of these connections will necessarily vary with different types of machines and valves. If, now, the centers of the shafts E and H are exactly in line, they will move with a uniform speed; but if by means of the screw K the center of shaft H is brought out of line with shaft E, then the shaft H receives an irregular motion, as best seen on the diagram. This motion is quite different from that produced by the elliptic gears. With the latter the change of rate of acceleration before reaching the fastest point is equal to the change of the rate of the retardation after this fastest point is passed, whereas in our arrangement the change of the rate of acceleration is much more intense than the change of the rate of retardation.

In our construction the maximum velocity is reached very quick and the velocity is kept above that of the driving-shaft for a longer period than the elliptic-gear motion does. This enables us to open our top inlet-valve quickly and still have a high speed to close it with during the period of fall of the stamp-shaft.

Figure 5:
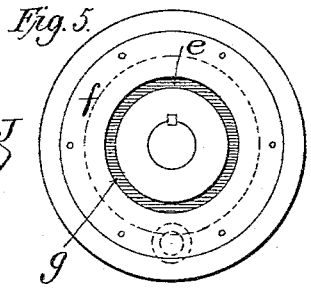
Figure 6:
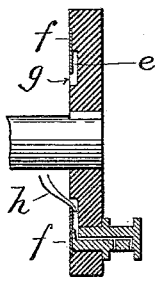

Owing to the peculiar arrangement of the cranks and the connecting-link it has been found necessary to provide special means for lubricating the crank-pins, and such arrangement is shown in Figs. 1, 5, and 6. Upon reference to Figs. 5 and 6 it will be seen that the cranks are provided on one of their flat faces with a circular groove or recess, $e$, partly covered by a plate, $f$, thus leaving an annular opening, $g$, on the inner face of the crank. A tube or spout, $h$, connected to an oil-reservoir, $i$, and projecting through the annular opening, $g$, conducts oil into the recess $e$, the rotation of the crank throwing the oil outward toward the outer wall of the recess, from which it finds its way through suitable holes in the crank-pins to the surface of the latter.

Figure 10:
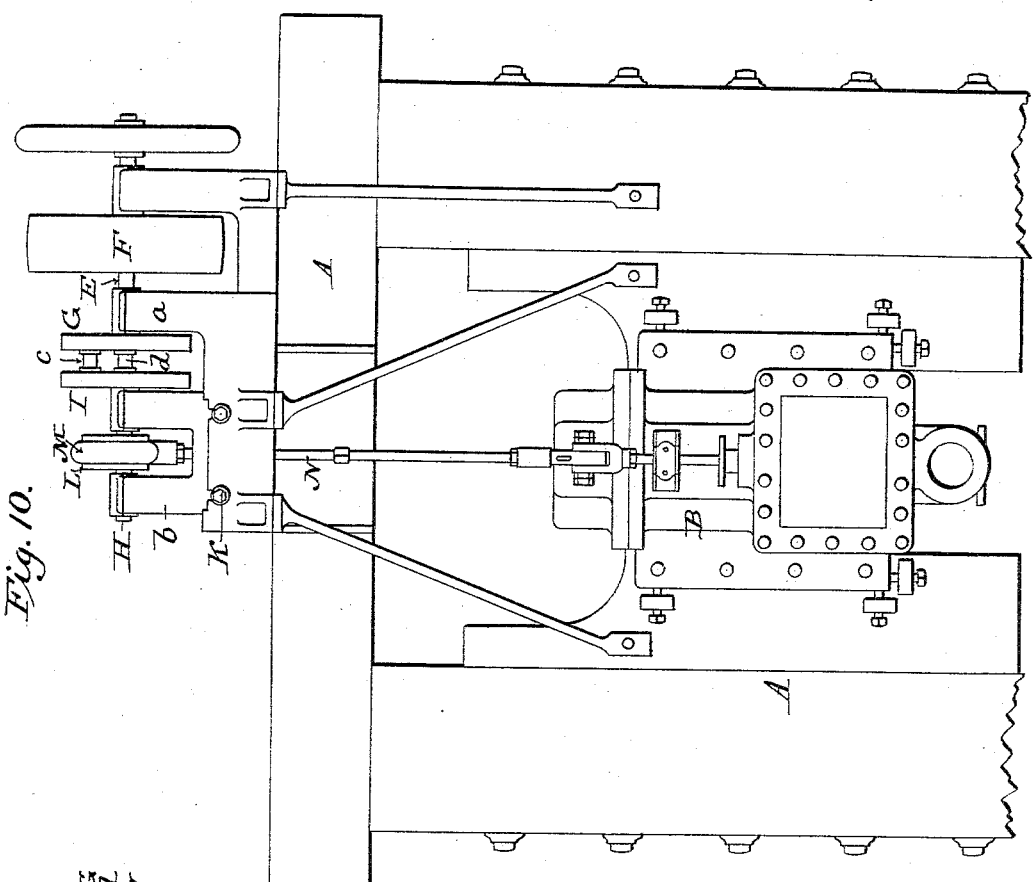
Figure 9:
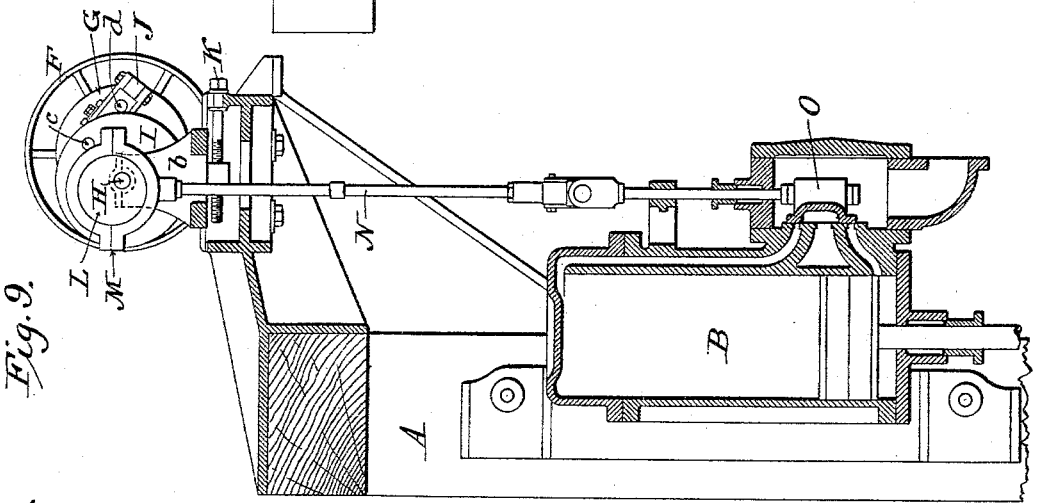

We prefer working the valve at the top of the cylinder with an accelerated motion and the lifting valve at the bottom with a regular rotary motion; but the same results may be secured by the use of one valve, as shown in Figs. 9 and 10. In said figures the shaft H is provided with an eccentric, L, the strap M of which connects by means of a link or pitman, N, with the single valve O.

No claim is made herein to the lubricating device shown in Figs. 5 and 6, as that forms the subject-matter of an application filed by us, Serial No. 272,893.

Having thus described our invention, what we claim is—

1. In a valve mechanism for ore-stamps, the combination, with the cylinder and its valves B C, of two revolving shafts each provided with a crank, a link connecting the cranks, and connections between the shafts and the valves.

2. In valve mechanism for ore-stamps, the combination, with a steam-cylinder and its valve, of a driving-shaft provided with a crank, a second shaft out of line with the driving-shaft and provided with a crank, a link connecting the cranks, and a connection between the driven shaft and the valve.

3. In a valve mechanism for ore-stamps, the combination, with a steam-cylinder and its valves, of a driving-shaft provided with a crank and connected with one of the valves, a second shaft out of line with the driving-shaft and provided with a crank, a link connecting the cranks, and a connection between the driven shaft and one of the valves.

4. In a valve mechanism for ore-stamps, the combination, with two revolving shafts, each provided with a crank, of a link connecting the cranks and means for changing or adjusting the relative positions of the shafts.

5. In combination with frame-work A, provided with cylinder B and bearings $a\,a$, shaft E, provided with band-wheel F, crank G, and crank-pin $d$, and mounted in the bearings $a\,a$, a second shaft, H, provided with crank I and crank-pin $c$ and mounted in the bearings $b\,b$, a link, J, connecting the crank-pins $c$ and $d$, a screw, K, adapted to adjust the bearings $b\,b$ to bring the shaft H into or out of alignment with the shaft E, and a connection between the driven shaft H and the valve or valves of the cylinder.

In witness whereof we hereunto set our hands in the presence of two witnesses.

EDWIN REYNOLDS.
BRUNO V. NORDBERG.

Witnesses:
F. A. LARKIN,
E. W. TUCKER.